United States Patent

[11] 3,616,411

[72] Inventors Fred P. Rudek
 Norristown;
 Michael D. Rutkowski, Phoenixville, both of Pa.
[21] Appl. No. 762,299
[22] Filed Sept. 16, 1968
[45] Patented Oct. 26, 1971
[73] Assignee General Electric Company

[54] PARTIAL PRESSURE SENSOR
1 Claim, 3 Drawing Figs.

[52] U.S. Cl. .................................................. 204/195, 117/130
[51] Int. Cl. ..................................................... G01n 27/46
[50] Field of Search ............................................ 204/1.1, 195; 136/86, 86 A–86 E, 120 FC

[56] References Cited
UNITED STATES PATENTS
2,805,191  9/1957  Hersch ........................ 204/1.1
3,097,974  7/1963  McEvoy et al. ................ 136/120 FC
3,149,921  9/1964  Warner ......................... 204/1.1
3,150,011  9/1964  Winsel et al. .................. 136/120 FC
3,239,444  3/1966  Heldenbrand ................... 204/195
3,432,355  3/1969  Niedrach et al. ................ 136/86

Primary Examiner—T. Tung
Attorneys—Paul F. Prestia, Allen E. Amgott, Henry W. Kaufmann, Frank L. Neuhauser, Oscar B. Waddell and Melvin M. Goldenberg ABSTRACT: In a redox cell type of partial pressure sensor, in which an entrant gas, metered by passage through a diffusion barrier, is ionized by contact with an adsorbing catalyst in the presence of an electrolyte, the stability of calibration with time, and the speed of response to changes in partial pressure, are both improved by providing the catalyst as a minimally thick layer deposited upon a nonabsorbing metal, the combination being maintained at the face of the diffusion barrier.

PATENTED OCT 26 1971 3,616,411

INVENTORS:
FRED P. RUDEK,
MICHAEL D. RUTKOWSKI,

BY Henry W. Kaufmann
AGENT

PARTIAL PRESSURE SENSOR

BACKGROUND OF THE INVENTION

1. Field of the Invention

This invention pertains to the measurement of partial pressures of gases by employing samples of the gas as reactants in a redox cell whose electrical output is limited by the available quantity of sampled gas.

2. Description of the Prior Art

U.S. Pat. No. 3,149,921 to Warner describes the basic technique of employing a fuel cell to measure partial pressures of a reactant gas, by arranging the various other cell conditions so that the cell electrical output is determined by the concentration of the reactant gas. This broad teaching makes available for application to measurement the numerous techniques for producing electricity from cells employing reactant gases as fuels and oxidants. However, the role as a measuring device necessarily imposes constraints with respect to stability of calibration and speed of response to changes in the quantity to be measured, which need not be considered in simple energy conversion devices. It has been customary to apply coatings of catalytic metals, such as gold in the case of oxygen, to durable substrates of less expensive metals, or to the faces of ion-exchange membranes, and employ mechanical pressure to maintain the catalyst in contact with the face of a diffusion barrier which serves to produce at its surface adjacent to the catalyst a concentration of reactant gas proportional to the partial pressure of that gas at its other surface (which is exposed to the space in which partial pressure is to be measured).

The use of mechanical pressure to maintain contact between the catalyst and the diffusion barrier is disadvantageous in that the forces producing it must necessarily be applied only at localized points, since otherwise the clamping means would obturate the entire area of the barrier and of the electrode, precluding their use. But the spotwise application necessarily leaves the possibility of warping or yielding creating a void between the barrier and the catalyst, leaving a region filled with electrolyte in which gas diffused through the barrier must first dissolve—a slow and limited process—before coming in contact with the catalyst. The alternative, that a gas space void of electrolyte might form in the gap between barrier and catalyst is no more comforting, although in practice no worse an impedance to gas ionization than the electrolyte-filled gap.

This problem may be attacked by attaching coatings of catalytic metal, e.g., gold directly to the face of the diffusion barrier so that gas passing the barrier will surely be provided catalytic facilities to ionize it. Once ionized, it can move freely through electrolyte or ion exchange membrane. Fixing the catalyst at the first point of entry of the gas into the ionic system assures that it will be converted at that point into an ionic form in which it can, figuratively, "look after itself." Ions are readily mobile in the electrolytic system; neutral gas atoms are not. This approach assures the immediate mobility of the diffused gas, so that it may thereafter be safely left to the operation of the various reactions in the cell.

However, the question of response time now enters. So far as can be determined, the noble metal catalysts which serve well in gas-accepting cells (e.g., gold for oxygen and palladium or platinum for hydrogen) function by reaction at the surface exposed to electrolyte; but they also absorb into their bulk the gas whose ionization they catalyze, in a density which, at least to a first approximation, is proportional to the partial pressure of the gas. This creates a time constant in the system, and reduces the speed of response of the device, in that when, for example, the partial pressure of gas rises, the increase does not all appear at once as an increase in gas to be ionized at the catalyst surface; some of the increase is first diverted to adding to the store in the volume of the catalyst. In general, slow response is undesirable in a measuring instrument (except in a few instances where it is useful for averaging out non significant rapid variations, which is not the case here).

SUMMARY OF THE INVENTION

In our present invention we provide the feature of catalyst so distributed as to provide a maximum ratio of catalyst surface exposed to electrolyte and unionized gas, to catalyst volume. In other words, we have minimized the bulk storage of gas in the catalyst. In one embodiment, we fix to the diffusion barrier a substrate of conductive material which negligibly absorbs the gas to be ionized, but does provide an adequate and reliable conductive path across the face of the catalyst-electrode system to be produced. This substrate is then coated by an electroless plating process with the catalyst. The plating process tends to be self-limiting, in that it deposits catalyst upon the substrate until a continuous film of catalyst is produced, and the deposition then ceases (or proceeds much more slowly). So thin a film upon a nonconductive substrate, such as the diffusion barrier, would be of objectionably high resistance, and could, by comparatively small mechanical distortions of the substrate (such as might occur with temperature changes) acquire microscopic cracks or similar faults, which would increase the resistance of the path to the external connection from the electrode, and might even form an isolated island of catalyst, reducing the effective area of the electrode. But the substrate may be made thick enough to avoid such dangers in it; and the thin coating of catalyst deposited upon it will then be surely connected, by a low-resistance path through the substrate, to the external connection.

DESCRIPTION OF THE PREFERRED EMBODIMENTS

Example 1. Partial embedment of nonabsorbent substrate powder in diffusion barrier with subsequent catalyst application.

Figure 1:
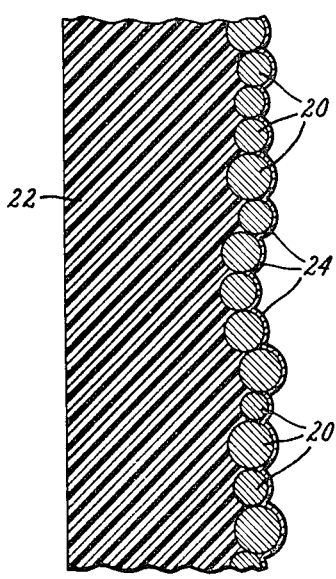
FIG. 1 represents schematically in section an embodiment of our invention in which particles of a noncatalytic electrically conductive substrate which is nonabsorptive of the gas to be measured are partially embedded in the surface of a diffusion barrier, and a thin layer of catalytic material is deposited upon the exposed surface of the substrate particles.

FIG. 1 represents schematically, in section and enlarged, a part of an embodiment of our invention in which powdered particles 20, of average size approximately 10 microns, of an electrically conductive material substantially nonabsorbent of the gas to be accommodated (e.g., nickel or stainless steel in the case of oxygen) are made into a slurry with a solvent for the material of the diffusion barrier 22, and are applied by silk screen techniques to the face of the diffusion barrier 22. These particles 20 become partially embedded in the inner face of the barrier 22 by the following mechanism: The solvent partially dissolves, or softens the face of the diffusion barrier 22, permitting the particles 20 to sink into it slightly. Exposure to the ambient air permits the solvent to evaporate, allowing the barrier material to harden again, retaining the particles 20 partially embedded in it. (Polyphenylene oxide 0.001 inch thick is a suitable barrier for diffusing oxygen in the normal partial pressure ranges of breathing mixtures, and trichlorethylene is a suitable solvent for it.) The particles are then coated with a layer of the catalyst metal (e.g., gold, in the case of oxygen) by immersion in an electroless plating solution. This procedure produces deposits of catalyst 24 upon those surface parts of the material 20 which are exposed to a solution applied to the face of the assembly. But these are exactly the electrolyte where ionization can occur in the presence of an electrolyte applied to the face of the barrier-catalytic electrode combination. Electroless deposition has the advantage that formulations are available which will deposit upon a foreign metal, which catalyzes the reaction, but cease to deposit (or deposit much more slowly) as soon as the workpiece is covered with the metal to be deposited. Thus a self-limiting operation is feasible which provides, over the entire surface of interest, and only there, just enough catalyst to cover that surface, and no more. Since the nonabsorbent metal 20 does not store gas, and has no other objectionable characteristics which restrict the quantity of it which may be used, the layer of particles 20 may be made amply thick to provide certainty of contact between adjacent particles.

Figure 2:
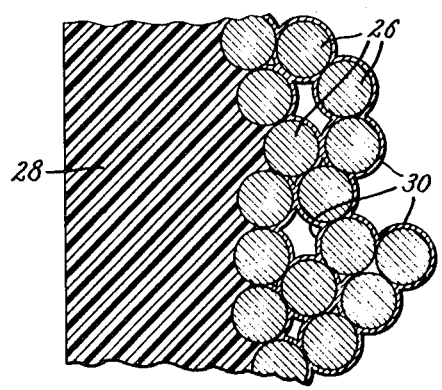
FIG. 2 represents schematically in section an embodiment of our invention in which a sintered porous substrate of material electrically conductive and nonabsorptive of the gas to be measured is partially embedded in the surface of a diffusion barrier, the exposed surface of the porous substrate being coated with a thin layer of catalytic material.
Figure 3:
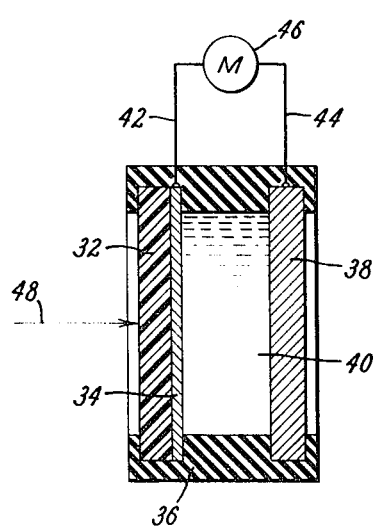
FIG. 3 represents schematically in section a cell which illustrates the use of the embodiments of our invention.

Electroless plating is in regular commercial practice. The term may refer to simple displacement or replacement plating in which a more active metal substrate atom becomes oxidized and reduces an atom of the less active metal to be deposited in its place. It is obvious that such a process must be self-limiting when the entire substrate surface is protected by deposited plating from further reaction. However, electroless plating is also considered to include processes in which chemical reduction by agents in the solution causes the deposition of metal plate upon substrates exposed to the solution. Even such solutions show an apparently almost instantaneous deposition of a thin film, which grows thicker at a much slower rate after the initial deposition. In the Journal of the Electrochemical Society, Volume 108 (1961), both of these points are confirmed. At page 632 thereof, fourth paragraph, R. W. Johnson says: "Replacement process...deposit is normally extremely thin due to the self-sealing effect of the deposited metal." Table 1 at page 634 shows such platinum deposits at 65 microinches thick. R. F. Walton, at page 771 in FIGS. 2 and 3, shows curves of density of gold deposited versus time which indicate the formation of an initial deposit in what appears, on the scale used, to be a negligibly short time; and at page 774, the second paragraph under the heading "Mechanism" indicates that a deposit varying from 0.5 to 4 milligrams per square inch occurs in the first few seconds of exposure to the solution. This density of deposit corresponds to a thickness from 1.6 to 12.6 microinches, determined by dividing the weight per square inch by the density of gold, 316.5 grams per cubic inch. Thus it is evident that electroless plating, in either guise, provides an extremely thin coating which is, however, a large number of atoms thick.

Since the thickness of an electroplated coating can also be limited by restricting the time of deposition, it is evident that electroplating may also be employed to apply the catalyst coating.

A convenient standard publication on metal deposition is the Metal Finishing Guidebook Directory, published annually by Metals and Plastics Publications, Inc., Westwood, New Jersey 07675. This, in its current (1968) edition, gives formulations for deposition by both electroless and electroplating processes.

A catalytic electrode of the kind described here has been found to have a response time well under 5 seconds, as compared with 20 seconds for a simple homogeneous layer of catalyst deposited upon the face of the diffusion barrier and serving both as catalyst and electrode.

Example 2. Porous sintered structure hot pressed into barrier face.

An alternative to the embedment from a slurry is the use, represented by FIG. 2, of a porous sintered structure of nonabsorbent material 26 which is heated and pressed into a thermoplastic diffusion barrier 28, producing the equivalent of a heat seal, leaving the sintered material partially embedded in the diffusion barrier. (Alternatively, the barrier may be softened by application of a solvent to its inner face for a time sufficient to render the material somewhat plastic.) The embedded porous material 26 may then be plated with catalyst 30 either electrolessly, or by electroplating. Electroless plating has the advantage that it more surely deposits catalyst within the pores of the porous substrate, without the problems of throwing power which exist in some electroplating baths. A compromise execution of the principles of our invention may be achieved even if throwing power problems exist, by plating the sintered structure 26 first, and then pressing it into diffusion barrier 28. In that case, there will be upon the parts of the porous structure 26 which are embedded in barrier 28, and so not accessible to the action of the electrolyte of the cell, small quantities of catalyst which are ineffective as catalysts, but can absorb some of the diffused gas. However, their separation, by the diffusion barrier sealed against them, from the exposed face of the diffusion barrier will reduce their deleterious effect on the time constant of the entire device, as will also the fact that the quantity of catalyst thus rendered ineffective will be small compared with the quantity of catalyst exposed to the solution and thus effective in causing ionization. This compromise execution may thus be regarded as a satisfactory alternative.

A virtue of this embodiment, which, in general, we consider preferable over the other we have disclosed, is that it can be made substantially thicker than any of the others, and so sufficiently stronger mechanically so that it provides a mechanical support to the necessarily thin layer which constitutes the diffusion barrier. Since a minimal volume of catalyst is employed, the response time of a cell employing such a structure may be a few seconds, as for the structure of example 1.

In FIG. 2 the structure of this example is represented in section and much enlarged. The porous sintered structure of nonabsorbent material 26 may be of nickel or stainless steel (e.g., AISI No. 316) powder which has been pressed and then heated in a reducing atmosphere until it is sintered into a compact mass, in accordance with the usual techniques of powder metallurgy. This is then affixed by partial embedment in the face of diffusion barrier 28, which may be of polyphenylene oxide, the embedment being effected either by hot pressing or by softening the face of the barrier by exposure to solvent such as trichlorethylene sufficient to soften it, prior to pressure. The material known commercially as Teflon FEP may also be used, by hot pressing. It is, of course, possible to use a cement to fasten the sintered mass to the barrier face; but this has the objectionable feature that it introduces between the barrier and the catalytic electrode an additional barrier whose diffusion characteristics will, in general, not be readily determined with certainty. The coating of catalyst 30 is then applied by application of a solution, preferably one for electroless plating.

FIG. 3, for completeness of disclosure, represents symbolically in section the use of the embodiments of our invention. A diffusion barrier 32 with a catalytic electrode 34 fixed to its inner face is sealed by a housing 36 here represented as rubber which is also sealed around a counterelectrode 38, which may for the measurement of oxygen be of an ionically oxidizable metal such as copper, as is disclosed in our cited copending application. The space between the two electrodes is filled with an electrolyte 40, which may be an aqueous solution of a hydroxide of an alkali metal. Conductors 42 and 44, hermetically sealed through housing 36, are connected respectively to catalytic electrode 34 and counterelectrode 38, and are also connected to a utilization device 46, here represented as a meter to measure the current flowing between catalytic electrode 34 and counterelectrode 38. This current is a measure of the partial pressure of gas (e.g., oxygen) on the outer (left, in the figure) side of diffusion barrier 32, the pressure of gas being symbolized by arrow 48. Since this cell operates by oxidation and reduction, it is known by the art terminology as a redox cell. The solution 40 is ion-conductive means in that it conducts oxygen ions from catalytic electrode means 34 to counterelectrode means 38. Solution 40 may be replaced, in alternative designs, by a layer of ion exchange resin; counterelectrode 38 may be catalytic electrode means provided with a plentiful supply of ionizable gas capable of reacting with the gas whose partial pressure is to be measured, such, for example, as hydrogen when the partial pressure of oxygen is to be measured. The catalytic electrode means firmly fixed to the diffusion barrier in accordance with our teachings may be used in such alternative designs, as known in the art, with the benefits we have shown.

It is noted that electroless gold plating baths are available from the following suppliers:

Shipley Company, Wellesley, Massachusetts
Engelhard Industries, Newark, New Jersey
Ethone Company, West Haven, Connecticut
American Chemical and Refining Company, Waterbury, Connecticut
Lea-Ronal Company, Waterbury, Connecticut Electroless palladium plating baths are available from the following suppliers:

J. Bishop and Company, Malvern, Pennsylvania
Engelhard Industries, Newark, New Jersey The listing of these suppliers is not represented to exhaust the list of such suppliers, nor to constitute in any way an endorsement of their products, but simply as evidence of the commercial availability of such baths.

We claim:

1. In a redox electrolytic cell for measuring the partial pressure of a gas comprising:

diffusion barrier means for metering, by diffusion through itself to its inner face, a flow into the said cell of a gas whose partial pressure at the outer face of the barrier external to the cell is to be measured;

catalytic electrode means affixed to the inner face of the said diffusion barrier for receiving the said gas in a neutral state and converting it into ions by transfer of electrons between the said gas and the said catalytic electrode means;

counterelectrode means;

ion-conductive means for conducting ions between the said catalytic electrode means and the said counterelectrode means;

the improvement comprising:

catalytic electrode means which comprises a porous mass of metal selected from the group consisting of nickel and stainless steel, partially embedded in the said diffusion barrier means and having its exposed surface not so embedded coated with a metal for the ionization of the said gas, said mass having its embedded surface free of such coating.

* * * * *